United States Patent
Hsieh

(10) Patent No.: US 7,064,518 B1
(45) Date of Patent: Jun. 20, 2006

(54) DRIVING CIRCUIT OF AN AC FAN MOTOR

(76) Inventor: Hsin-Mao Hsieh, No. 6, East Section, Chiao Nan Li, Industrial 6th Rd., Pingtung Hsien (TW)

( * ) Notice: Subject to any disclaimer, the term of this patent is extended or adjusted under 35 U.S.C. 154(b) by 0 days.

(21) Appl. No.: 11/104,693

(22) Filed: Apr. 11, 2005

(51) Int. Cl.
*H02P 27/04* (2006.01)

(52) U.S. Cl. .............. 318/802; 318/800; 318/803; 318/806; 318/807; 318/811

(58) Field of Classification Search ............ 318/138, 318/254, 439, 811, 700–803
See application file for complete search history.

(56) References Cited

U.S. PATENT DOCUMENTS

| | | | | |
|---|---|---|---|---|
| 5,708,337 | A * | 1/1998 | Breit et al. | 318/439 |
| 5,945,800 | A * | 8/1999 | Chen | 318/696 |
| 6,317,571 | B1 * | 11/2001 | Adams | 399/67 |
| 2002/0105293 | A1 * | 8/2002 | Harlan | 318/254 |
| 2003/0011465 | A1 * | 1/2003 | Reinhardt et al. | 340/3.5 |
| 2003/0098660 | A1 * | 5/2003 | Erdman et al. | 318/254 |

* cited by examiner

*Primary Examiner*—Rina Duda
*Assistant Examiner*—Tyrone Smith
(74) *Attorney, Agent, or Firm*—Dallett & Walters

(57) ABSTRACT

A driving circuit of an AC fan motor has an AC to DC converter, a regulated voltage divider, a motor driving unit, two windings each having many coils and a harmonic wave suppression unit. The AC to DC converter converts AC power to high voltage DC power. Since the motor driving unit requires low voltage DC power, the motor driving unit is connected to the AC to DC converter through the regulated voltage divider. The two windings are directly connected to the AC to DC converter to obtain the high voltage DC power. Therefore, when the motor driving unit drives the windings, a large current will pass through the winding to increase rotation ration. Since each winding has many coils, the large current can be held in a suitable range to prevent the winding from being damaged by the large current.

8 Claims, 4 Drawing Sheets

DRIVING CIRCUIT OF AN AC FAN MOTOR

BACKGROUND OF THE INVENTION

1. Field of the Invention

The present invention relates to a driving circuit of an AC fan motor and more particularly to a driving circuit of an AC fan motor providing high voltage DC power to coils of the motor to increase the rotation rate of the motor.

2. Description of Related Art

With reference to FIG. 3, an AC motor (20) has two coils (La, Lb). The two coils (La, Lb) are connected in series and then connected to an AC power source (AC IN). Since AC power has a positive cycle and a negative cycle, shifting electromagnetic poles (N/S) are produced in the AC motor to drive and rotate the AC motor when AC power is input to the coils (La, Lb).

The AC motor has a low rotation rate and high power consumption, so a portion of the power will be converted to heat inside the AC motor when the AC motor is driven. Operational safety considerations mandate that an AC motor's casing not be made of plastic so the AC motor is heavy. In addition, the electromagnet cores and windings of the AC motor tend to be very large so the AC motor is not easy to miniaturize.

Therefore, the present invention provides a driving circuit to miniaturize the AC motor and make the AC motor have a high rotation rate and low power consumption.

SUMMARY OF THE INVENTION

The main objective of the present invention is to provide a driving circuit of an AC fan motor that uses AC power effectively to increase the rotation rate and decrease the power consumption. Therefore, the AC fan motor will produce less heat and has a plastic casing to decrease weight.

The main feature of the present invention is connecting two windings of the AC fan motor to a high voltage DC power source in parallel, and providing a regulated low voltage to a motor driving unit. When the motor driving unit allows the high voltage DC power to flow through the winding by closing the circuit through the winding, a large current passes through the winding to increase the rotation rate of the AC fan motor. Since each winding has many coils, the large current is limited to a suitable range to keep from damaging the windings. The windings are directly connected to high voltage DC power so power consumption is low and less heat will be generated inside the AC fan motor. Thus, the AC fan motor can use a plastic casing to reduce weight.

Other objectives, advantages and novel features of the invention will become more apparent from the following detailed description when taken in conjunction with the accompanying drawings.

DETAILED DESCRIPTION OF THE PREFERRED EMBODIMENT

Figure 1:
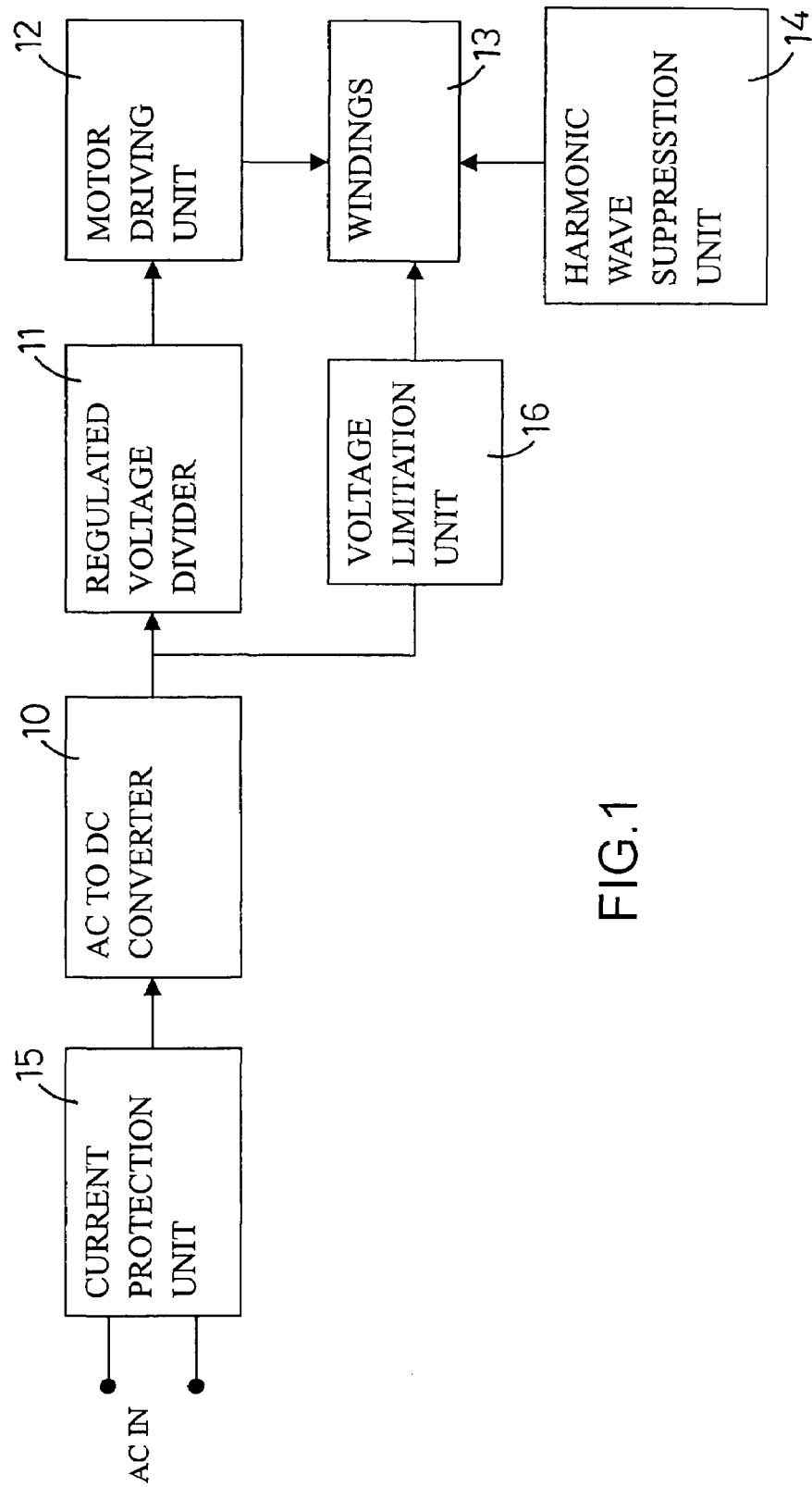
FIG. 1 is a functional block diagram of a driving circuit of an AC fan motor in accordance with the present invention.

With reference to FIG. 1, a preferred embodiment of a driving circuit for an AC fan motor has an AC to DC converter (10), a regulated voltage divider (11), a motor driving unit (12), two windings (13), a harmonic wave suppression unit (14) an optional current protection unit (15) and an optional voltage limitation unit (16).

Figure 2A:
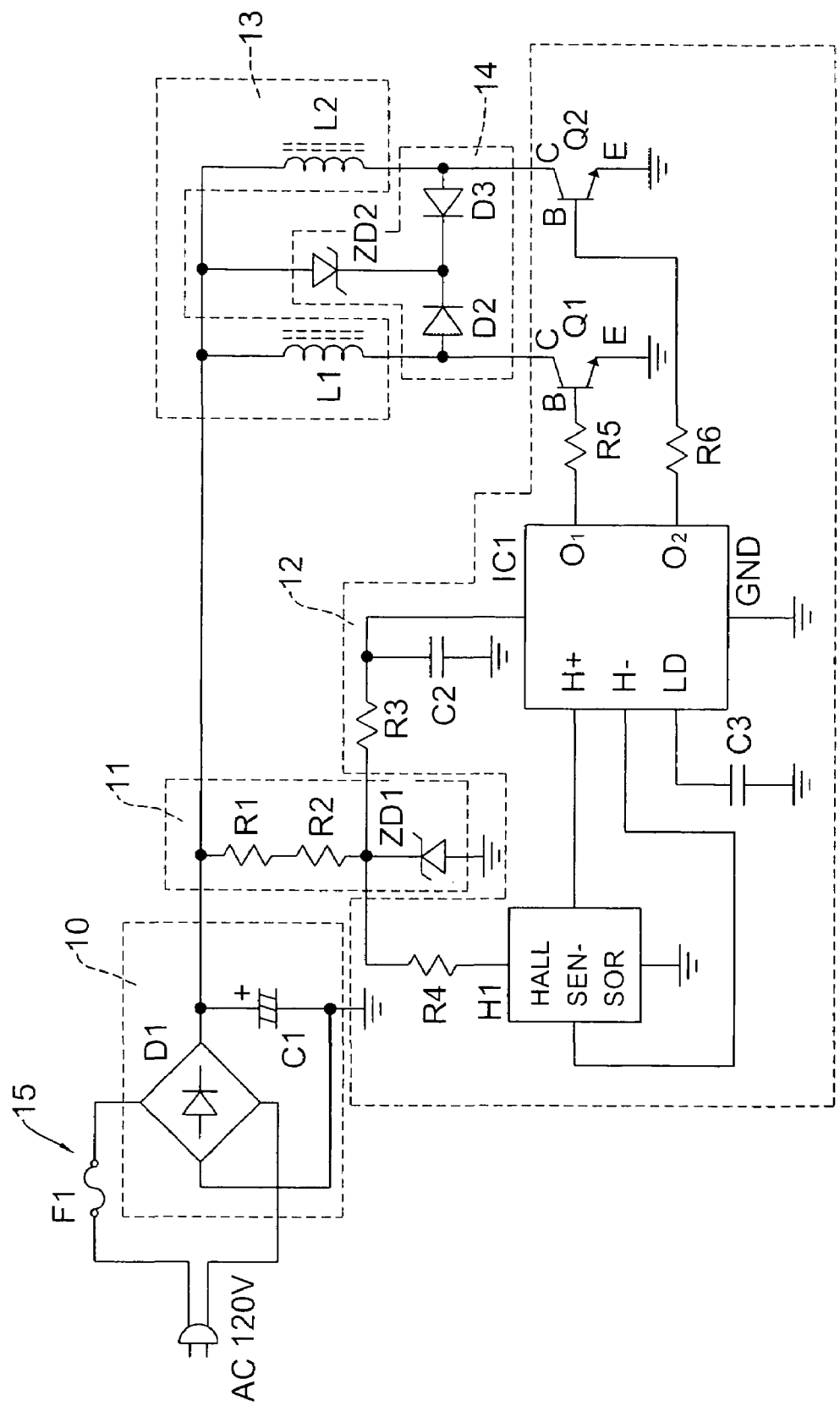
FIG. 2A is a circuit diagram of a first embodiment of the driving circuit of an AC fan motor in FIG. 1.

With further reference to FIG. 2A, the AC to DC converter (10) has a rectifier (D1) and a filter (C1). The rectifier (D1) can be a full wave rectifier and has an AC power input and DC power output. The AC power input is connected to an AC power source (AC 120 V) to rectify AC power to DC power. The filter (C1) is a capacitor connected to DC power output to output high voltage DC power.

The regulated voltage divider (11) is connected to the filter (C1) and the high voltage DC power to obtain low voltage DC power. The regulated voltage divider (11) has a large resistor, a node and a zener diode (ZD1) connected in series. The large resistor is connected to the high voltage DC power and the filter (C1), and may be two large resistors (R1, R2). The node is connected to the large resistor. The zener diode (ZD1) has a breakdown voltage, is connected between the node and ground and operates at the breakdown voltage. Consequently, a regulated low voltage is dropped across the zener diode (ZD1) and provided at the node.

The motor driving unit (12) is connected to the regulated voltage divider (11) to obtain low voltage DC power and has a first transistor (Q1), a second transistor (Q2), a driving IC (IC1) and a Hall sensor (H1). Each transistor (Q1, Q2) has a base terminal (B), a collector terminal (C) and an emitter terminal (E). The driving IC (IC1) has a low voltage DC input, two Hall signal inputs (H+, H−) and two control outputs (O1, O2). The low voltage DC input is connected to the node in the regulated voltage divider (11). The two control outputs (O1, O2) are connected respectively to the base terminals (B) of the transistors (Q1, Q2) to alternately turn the transistors (Q1, Q2) on and off. The Hall sensor (H1) is connected to the Hall signal inputs (H+, H−) of the driving IC (IC1) and has a low voltage DC input connected to the node in the regulated voltage divider (11).

The windings (13) have a first winding (L1) and a second winding (L2) and are connected to the high voltage DC power, the filter (C1) and respectively to the collector terminals (C) of the transistors (Q1, Q2). Since the windings (13) are directly connected to high voltage DC power, a large current is passed through the windings (13). To prevent the windings (13) from being damaged by the large current, each winding (L1, L2) has many coils to increase the resistance. Therefore, the large current will be held in a suitable range to increase the rotation rate of the AC fan motor, and the windings (L1, L2) will not be damaged. Since high voltage DC power is applied to the windings (L1, L2), the AC fan motor has low power consumption and produces less heat. Thus, the AC fan motor can use the plastic shell to reduce the weight of the AC fan motor. The AC fan motor uses the driving circuit in accordance with the present invention, which reduces power consumption about 40% compared to an equivalent conventional AC fan motor.

The harmonic wave suppression unit (14) is connected to the high voltage DC power in parallel with the windings (L1, L2) and has two diodes (D2, D3) and a zener diode (ZD2). Each diode (D2, D3, ZD2) has a negative terminal and a positive terminal. The negative terminals of the two diodes (D2, D3) and the zener diode (ZD2) are connected together. The positive terminals of the two diodes (D2, D3) are connected respectively to the collector terminals (C) of the transistors (Q1, Q2). The positive terminal of the zener diode (ZD2) is connected to the high voltage DC power and the filter (C1) to obtain high voltage DC power.

The current protection unit (15) can be implemented with a fuse (f1) or a resistor (R7) as shown in FIG. 21B and connected between the AC power source (AC 120 V) and the AC power input of the rectifier (D1).

Figure 2B:
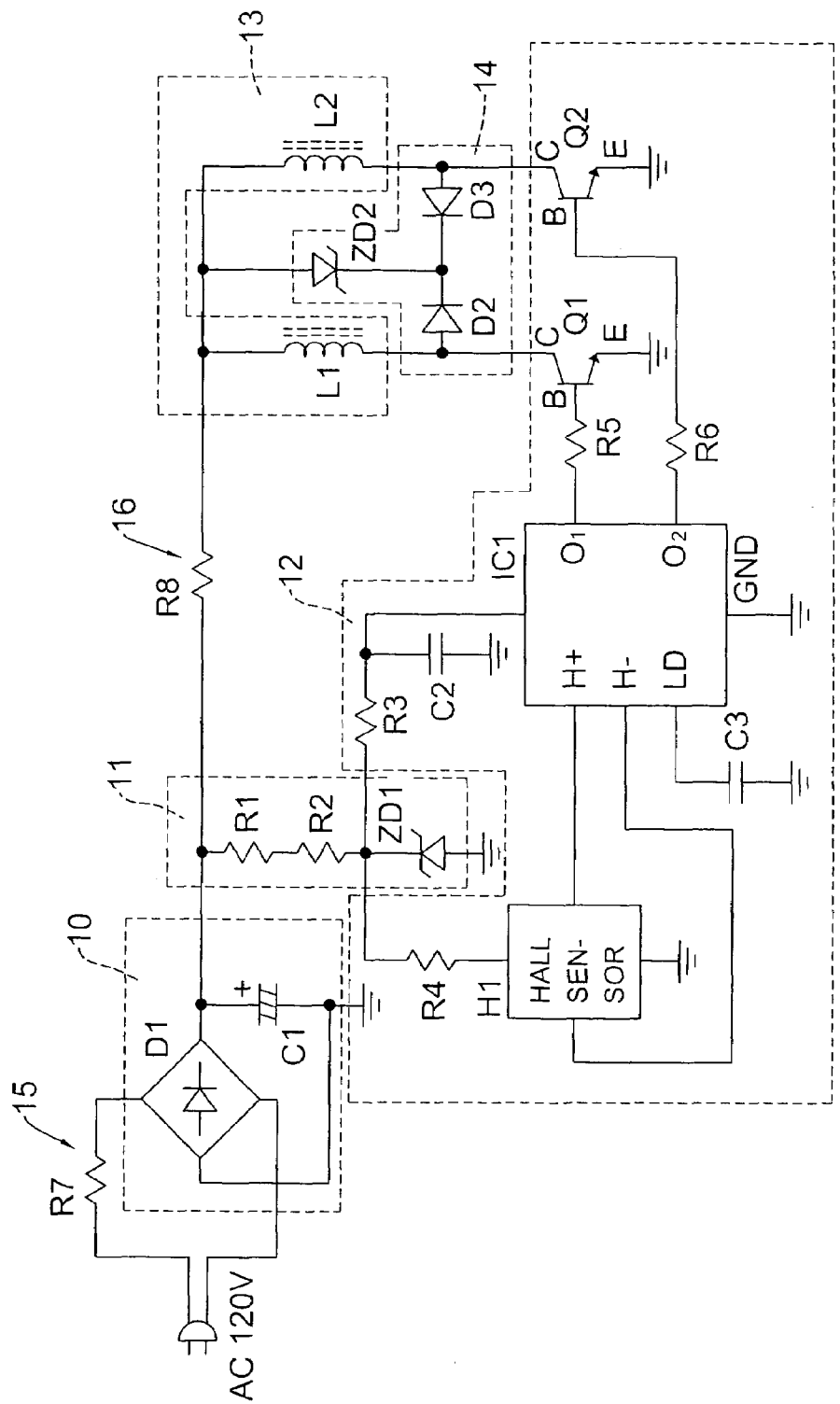
FIG. 2B is a circuit diagram of a second embodiment of the driving circuit of an AC fan motor in FIG. 1.
Figure 3:
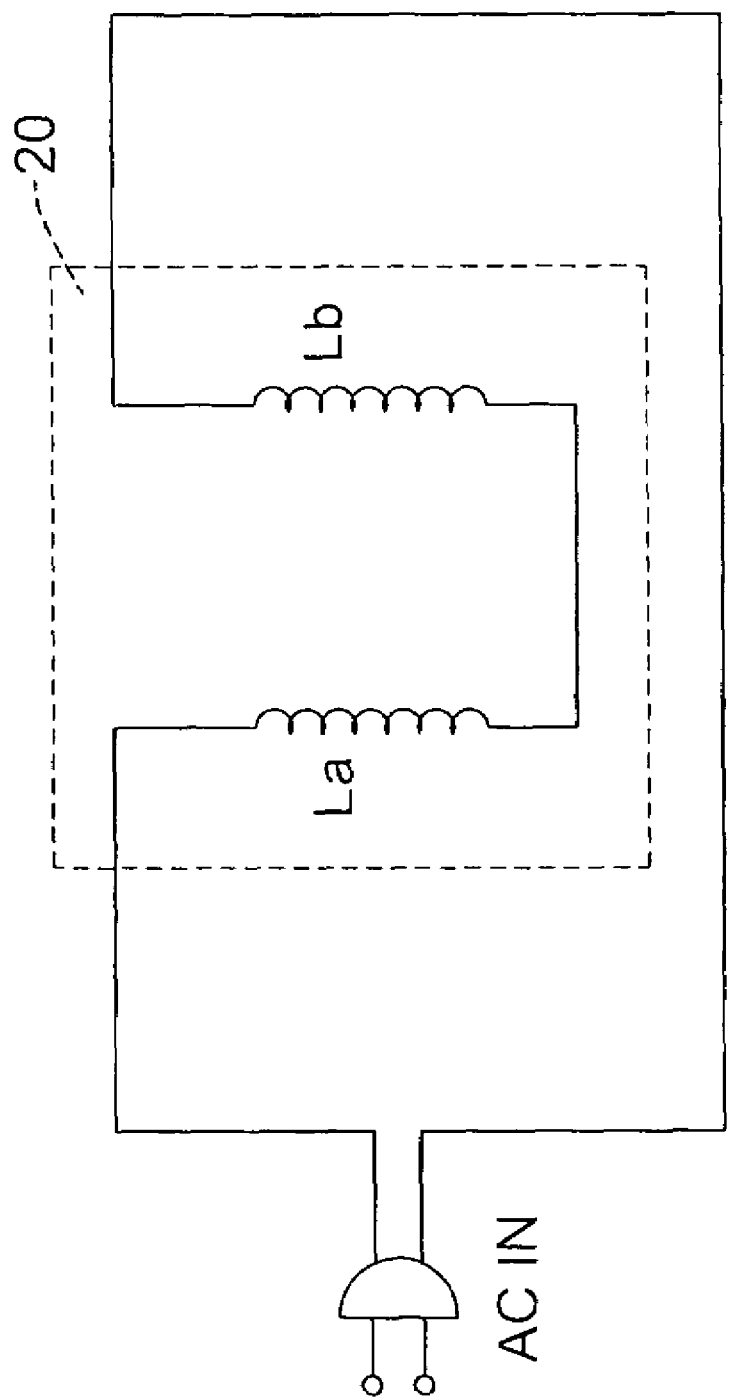
FIG. 3 is a circuit diagram of a stator of a conventional AC fan motor in accordance with the prior art.

With reference to FIGS. 1 and 2B, the windings (13) can be connected to the AC to DC converter through the voltage limitation unit (16). The voltage limitation unit can use a resistor (R8).

The windings (13) operate when high voltage DC power is applied alternately to the first and second windings (L1, L2). When the driving IC (IC1) turns on the first transistor (Q1), a large current will pass through the first winding (L1) since the first winding (L1) is connected to high voltage DC power. When the driving IC (IC1) simultaneously turns on the second transistor (Q2) and turns off the first transistor (Q1), a counter-electromotive force (CEMF) is produced in the first winding (L1). The CEMF in the first winding (L1) causes a reverse current. The reverse current will pass through the diode (D2) connected to the first winding (L1) and the zener diode (ZD2). When the windings (L1, L2) are switched again, the CEMF in the second winding (L2) causes a reverse current that passes through the diode (D3) connected to the second winding (L2) and the zener diode (ZD2). Therefore, the harmonic wave suppression unit suppresses the harmonic waves caused by the CEMF, and noise generated during operation of the AC fan motor will be decreased.

Even though numerous characteristics and advantages of the present invention have been set forth in the foregoing description, together with details of the structure and function of the invention, the disclosure is illustrative only. Changes may be made in detail, especially in matters of shape, size, and arrangement of parts within the principles of the invention to the full extent indicated by the broad general meaning of the terms in which the appended claims are expressed.

What is claimed is:

1. A driving circuit of all AC fan motor, comprising:
    an AC to DC converter having
        a rectifier having an AC power input and a DC power output and converting AC power to DC power; and
        a filter connected to the DC power output to output high voltage DC power;
    a regulated voltage divider connected to the filter to obtain low voltage DC power and having
        a large resistor connected to high voltage DC power and the filter;
        a node connected to the large resistor; and
        a zener diode having a breakdown voltage, connected between the node and ground and operating at the breakdown voltage;
    a motor driving unit connected to the regulated voltage divider to obtain the low voltage DC power, and having:
        two transistors, each transistor having a collector terminal, an emitter terminal and base terminal;
        a driving IC having
            a low voltage DC input connected to the node in the regulated voltage divider;
            two Hall signal inputs; and
            two controlling outputs connected respectively to the base terminals of the transistors to alternately turn the transistors on and off; and
        a Hall sensor connected to the Hall signal inputs of the driving IC and having a low voltage DC input connected to the node in the regulated voltage divider;
    windings having a first winding and a second winding connected to the high voltage DC power, the filter and respectively to the collector terminals of the transistors, and each winding having multiple coils; and
    a harmonic wave suppression unit connected to the high voltage DC power in parallel with the windings comprising
        two diodes, each diode having
            a negative terminal; and
            a positive terminal connected to the collector terminal of a corresponding transistor in the motor driving unit; and
        a zener diode having
            a negative terminal connected to the negative terminals of the two diodes; and
            a positive terminal connected to the high voltage DC power and the filter to obtain the DC power source with high voltage.

2. The driving circuit as claimed in claim 1, further comprising a current protection unit connected between the AC power source and the AC power input of the rectifier.

3. The driving circuit as claimed in claim 2, wherein the protection unit is a fuse.

4. The driving circuit as claimed in claim 2, wherein the protection unit is a resistor.

5. The driving circuit as claimed in claim 1, wherein the rectifier is a full wave rectifier.

6. The driving circuit as claimed in claim 1, wherein the filter is a capacitor.

7. The driving circuit as claimed in claim 1, wherein the AC to DC converter is connected to the windings through a voltage limitation unit.

8. The driving circuit as claimed in claim 7, wherein the voltage limitation unit is a resistor.

* * * * *